US012590562B2

(12) United States Patent

Davis et al.

(10) Patent No.: US 12,590,562 B2

(45) Date of Patent: Mar. 31, 2026

(54) COMPONENT MOUNTING AND DRIVE IN A GEARED TURBOFAN ARCHITECTURE

(71) Applicant: RTX CORPORATION, Farmington, CT (US)

(72) Inventors: Todd A. Davis, Tolland, CT (US); David Allen Stachowiak, Durham, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/417,532

(22) Filed: Jan. 19, 2024

(65) Prior Publication Data

US 2025/0237174 A1     Jul. 24, 2025

(51) Int. Cl.
*F02C 7/36*     (2006.01)
*F02C 7/32*     (2006.01)

(52) U.S. Cl.
CPC .................. *F02C 7/36* (2013.01); *F02C 7/32* (2013.01); *F05D 2220/36* (2013.01); *F05D 2260/30* (2013.01); *F05D 2260/40311* (2013.01)

(58) Field of Classification Search
None
See application file for complete search history.

(56) References Cited

U.S. PATENT DOCUMENTS

| | | | | |
|---|---|---|---|---|
| 8,911,203 B2 * | 12/2014 | Reinhardt | ................. | F02K 3/06 |
| | | | | 415/124.2 |
| 11,047,252 B2 * | 6/2021 | Bordoni | .................. | F01D 15/12 |

| | | | | |
|---|---|---|---|---|
| 11,193,425 B2 * | 12/2021 | Hanrahan | ................. | F02C 7/36 |
| 11,313,440 B2 | 4/2022 | Harvey | | |
| 11,754,002 B2 | 9/2023 | Niepceron et al. | | |
| 11,802,514 B2 | 10/2023 | Niepceron et al. | | |
| 2012/0251306 A1 * | 10/2012 | Reinhardt | ................. | F02K 3/06 |
| | | | | 415/182.1 |
| 2017/0051672 A1 | 2/2017 | Nowakowski et al. | | |
| 2018/0073384 A1 * | 3/2018 | Bordoni | .................. | F01D 19/00 |
| 2020/0400078 A1 * | 12/2020 | Hanrahan | ............... | F16H 48/08 |
| 2023/0016164 A1 * | 1/2023 | Chatelois | ................ | F02C 6/206 |
| 2023/0126327 A1 | 4/2023 | Levisse et al. | | |
| 2023/0313739 A1 | 10/2023 | Becoulet et al. | | |
| 2023/0340911 A1 | 10/2023 | Ertas et al. | | |

FOREIGN PATENT DOCUMENTS

| | | |
|---|---|---|
| FR | 3130874 A1 | 6/2023 |
| WO | 2020257396 A1 | 12/2020 |

OTHER PUBLICATIONS

Extended European Search Report for European Application No. 25152945.9 mailed May 22, 2025.

* cited by examiner

*Primary Examiner* — Juan G Flores

(74) *Attorney, Agent, or Firm* — Carlson, Gaskey & Olds, P.C.

(57)     ABSTRACT

A fan drive gear system for a turbine engine includes a sun gear configured to be driven by an engine shaft that is rotatable about an axis, a plurality of intermediate gears coupled to a first gear portion of the sun gear, a ring gear that is coupled to the plurality of intermediate gears, and a carrier supporting rotation of the plurality of intermediate gears. A coupling shaft is engaged to drive the sun gear and includes a gear portion. An accessory component is coupled to and driven by the gear portion of the coupling shaft.

11 Claims, 5 Drawing Sheets

1

COMPONENT MOUNTING AND DRIVE IN A GEARED TURBOFAN ARCHITECTURE

TECHNICAL FIELD

The present disclosure relates generally to fan drive gear system for turbofan engine with a component driven by a portion of the fan drive gear system.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. Accessory components such as motors and pumps are utilized to support operation of the engine. The accessory components are conventionally driven by a coupling to an engine shaft. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, a plurality of intermediate gears that are coupled to the sun gear, a ring gear that is coupled to the plurality of intermediate gears, a carrier supporting rotation of the plurality of intermediate gears, a coupling shaft that is engaged to drive the sun gear, the coupling shaft includes a gear portion, and an accessory component that is coupled to the gear portion of the coupling shaft.

In a further embodiment of the foregoing fan drive gear system, the ring gear assembly is attached to a static engine structure and the carrier is rotatable about the axis.

In a further embodiment of any of the foregoing, the fan drive gear system further includes a flexible coupling between the ring gear and the static engine structure and the accessory component is mounted to the flexible coupling.

In a further embodiment of any of the foregoing fan drive gear systems, the accessory component is mounted downstream of the carrier to a portion of the static engine structure.

In a further embodiment of any of the foregoing fan drive gear systems, the carrier is attached to a static engine structure and the ring gear is rotatable about the axis.

In a further embodiment of any of the foregoing fan drive gear systems, the gear portion is disposed upstream of the carrier.

In a further embodiment of any of the foregoing fan drive gear systems, the coupling shaft includes at least one flexible portion for accommodating relative movement between an engine shaft and the fan drive gear system.

In a further embodiment of any of the foregoing, the fan drive system further includes a flexible mount between the carrier and a static engine structure and both the carrier and the accessory component are mounted to the flexible mount.

In a further embodiment of any of the foregoing fan drive gear systems, the accessory component includes a fluid pump.

In a further embodiment of any of the foregoing fan drive gear systems, the accessory component includes an electric motor/generator.

A turbine engine assembly according to another exemplary embodiment of this disclosure includes, among other possible things, a static engine structure, a fan section that includes a plurality of blades that are rotatable about an axis, a fan drive gear system that includes a sun gear that is configured to be driven by an engine shaft that is rotatable about an axis, a plurality of intermediate gears that are coupled to the sun gear, a ring gear that is coupled to the plurality of intermediate gears, and a carrier supporting rotation of the plurality of intermediate gears. A coupling shaft is coupled to an engine drive shaft and engaged to drive the sun gear. The coupling shaft includes a gear portion, an accessory component that is coupled to the gear portion of the coupling shaft, and a fan drive shaft that is coupled to a portion of the fan drive gear system to drive the fan section.

In a further embodiment of the foregoing turbine engine assembly, the ring gear assembly is attached to a static engine structure through a flexible mount. The carrier is rotatable about the axis and the accessory component is mounted to the static engine structure.

In a further embodiment of any of the foregoing turbine engine assemblies, the ring gear assembly is attached to a static engine structure through a flexible mount. The carrier is rotatable about the axis and the accessory component is mounted to the flexible coupling.

In a further embodiment of any of the foregoing turbine engine assemblies, the carrier is attached to a static engine structure through a flexible mount. The ring gear is rotatable about the axis and the accessory component is mounted to the flexible mount.

In a further embodiment of any of the foregoing turbine engine assemblies, the gear portion of the coupling shaft is disposed downstream of the carrier.

In a further embodiment of any of the foregoing turbine engine assemblies, the accessory component includes one of a fluid pump or an electric motor/generator.

A method of powering an accessory component of a turbine engine assembly according to another exemplary embodiment of this disclosure includes, among other possible things, assembling a fan drive gear system that includes a sun gear that is configured to be driven by an engine shaft that is rotatable about an axis, a plurality of intermediate gears that are coupled to the sun gear, a ring gear that is coupled to the plurality of intermediate gears, and a carrier that supports rotation of the plurality of intermediate gears. A coupling shaft is coupled between an engine drive shaft and sun gear. An accessory component is mounted proximate the fan drive gear system. A driven gear of the accessory component is coupled to the gear portion of the coupling shaft. A fan drive shaft is coupled to a portion of the fan drive gear system to drive a fan section.

In a further embodiment of the foregoing, the method further includes assembling the fan drive gear system such that the ring gear assembly is attached to a static engine structure through a flexible mount. The carrier is rotatable about the axis and the accessory component is mounted to the static engine structure.

In a further embodiment of any of the foregoing, the method further includes assembling the fan drive gear system such that the ring gear assembly is attached to a static engine structure through a flexible mount. The carrier is rotatable about the axis and the accessory component is mounted to the flexible coupling.

In a further embodiment of any of the foregoing, the method further includes assembling the fan drive gear system such that the carrier is attached to a static engine structure through a flexible mount. The ring gear is rotatable about the axis and the accessory component is mounted to a static engine structure.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
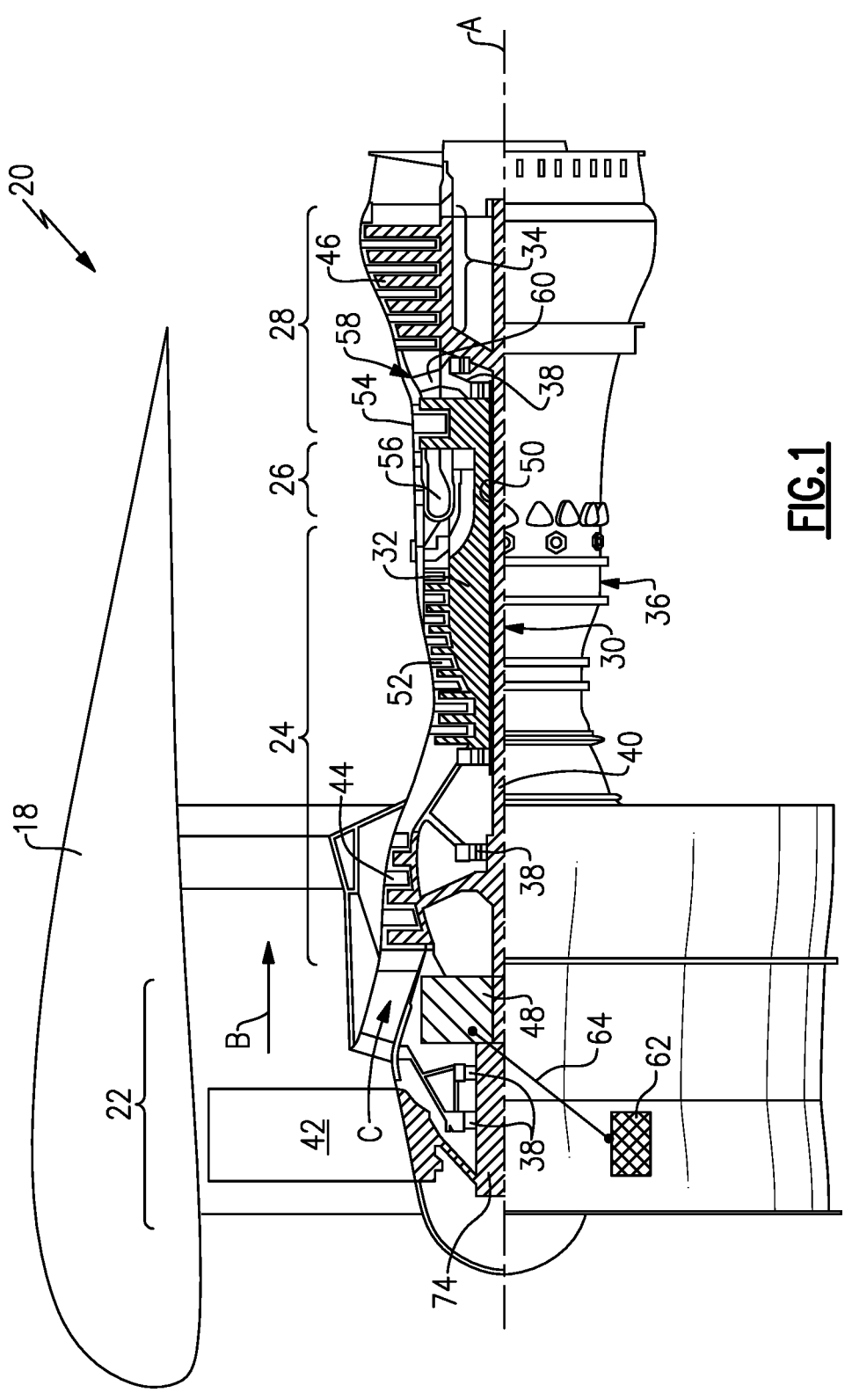
FIG. 1 is a schematic view of an example gas turbine engine including a fan drive gear system.

FIG. 1 schematically illustrates a gas turbine engine 20 with an epicyclic fan drive gear system 48 that drives a fan section 22 and an accessory component 62. The accessory component is driven through a coupling 64 to a portion of the gear system 48.

The gas turbine engine 20 is disclosed herein as a two-spool turbofan that generally incorporates a fan section 22, a compressor section 24, a combustor section 26 and a turbine section 28. The fan section 22 includes a plurality of fan blades 42 and drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72.

The fan drive gear system 48 is an epicycle gear train with a gear reduction ratio of greater than about 2:1 and less than about 18:1. In another example embodiment, the fan drive gear system 48 provides a gear reduction ratio of between 5:1 and 14:1. The gear system 48 is driven by an engine shaft 40 and is coupled to a fan shaft 74 to drive the fan section 22 about the engine axis A. It should be understood, however, that the above parameters are only exemplary of one embodiment of a geared engine architecture and that the present disclosure is applicable to other gas turbine engine architectures including turbofan, turboshaft, and open rotor engines.

Figure 2:
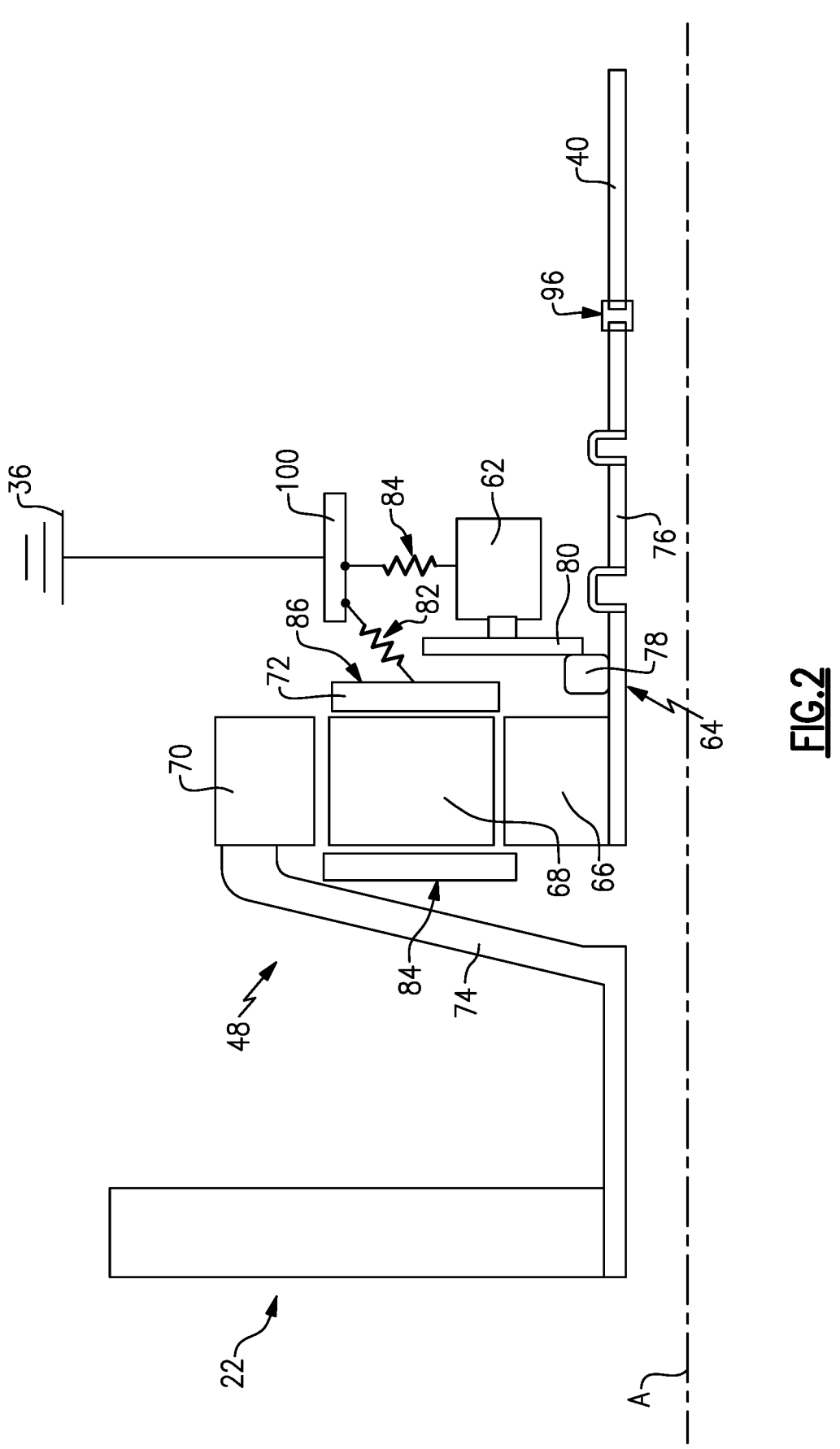
FIG. 2 is a schematic view an example fan drive gear system embodiment.
Figure 3:
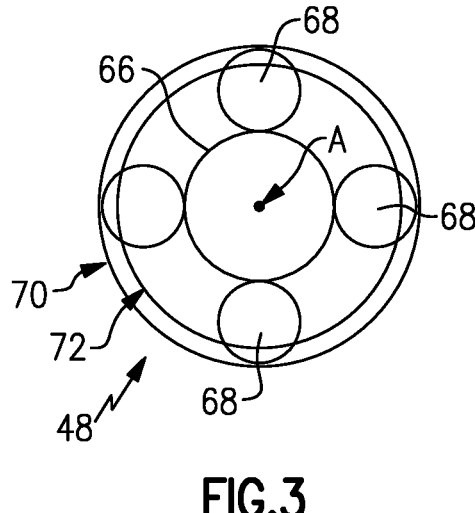
FIG. 3 is another schematic view of the example fan drive gear system embodiment shown in FIG. 2.

Referring to FIGS. 2 and 3 with continued reference to FIG. 1, the example fan drive gear system 48 is an epicyclic gear system with a sun gear 66 engaged to a plurality of intermediate gears 68 supported by a carrier 72. A ring gear 70 circumscribes the intermediate gears 68 and is engaged by the intermediate gears 68. In the example embodiment shown in FIG. 2, the ring gear 70 rotates about the axis A and is a drive output through the fan shaft 74 that drives the fan section 22. The carrier 72 is fixed to a static engine structure 36. Accordingly, example epicyclic gear system 48 may be referred to as a star gear system.

The sun gear 66 is driven by an engine shaft 40 through a coupling shaft 76. The coupling shaft 76 provides a flexible connection between the engine shaft 40 and the sun gear 66 to accommodate misalignment and relative movement.

The coupling shaft 76 includes a gear portion 78 that is engaged to the driven gear 80 to drive the accessory component 62 through a coupling 64. The coupling shaft 76 is attached to the engine shaft 40 through a connection 96. The example engine shaft is the low shaft 40, but other engine shafts that drive the fan drive gear system 48 may also be utilized and are within the contemplation and scope of this disclosure.

The gear portion 78 may be a gear attached to the coupling shaft 76 or an integrally formed portion of the coupling shaft 76. Moreover, the coupling 64 between the gear portion 78 and the driven gear 80 may provide a desired gear ratio to effect a speed change relative to the speed of the engine shaft 40. Additionally, although a single component is shown by way of example, multiple components may be driven by the fan drive gear system 48 and remain within the scope and contemplation of this disclosure.

The component 62 is mounted to the static engine structure 36 through a fixed or flexible mount 84. The carrier 72 is also mounted to the static engine structure 36 through a fixed or flexible mount 82. The mounts 82 and 84 are part of the fan drive gear system mount 100 that is attached to the static engine structure 36.

A fixed mounting is a substantially rigid mounting where a flexible mounting provides some intended flexibility to allow movement that accommodates relative misalignment or movement between mated parts. In the disclosed examples, portions of the fan drive gear system 48 that do not rotate about the engine axis and are attached to the engine static structure may be fixed or flexibly mounted and remain within the scope and contemplation of this disclosure. Moreover, in some embodiments, components may be fixed to each other while the combination of components are flexibly mounted to the engine static structure. Accordingly, the carrier 72 and component 62 are both mounted to the common mount 100 or common engine case structure (36).

Figure 4:
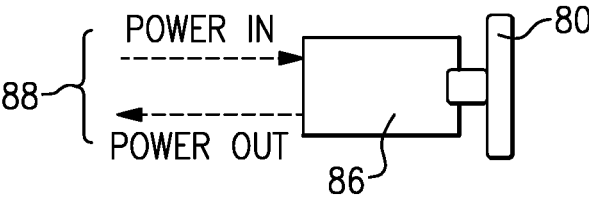
FIG. 4 is a schematic view of an example accessory component embodiment.
Figure 5:
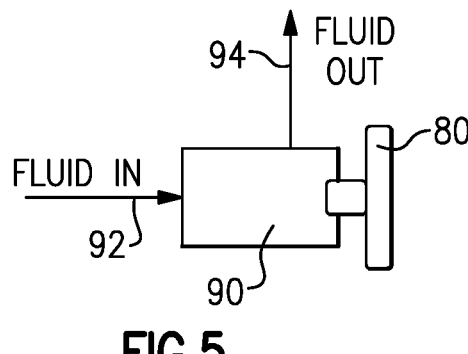
FIG. 5 is a schematic view of another example accessory component embodiment.

Referring to FIGS. 4 and 5 with continued reference to FIG. 2, the accessory component 62 may be any device that is driven to support engine operation. In one example embodiment, the accessory component is an electric motor/generator 86 as shown in FIG. 4 that operates to either received or produce electric power 88. In another example embodiment, the accessory component is a fluid pump 90 as shown in FIG. 5. The example fluid pump 90 receives in inlet fluid flow 92 and exhausts an outlet flow 94 and an increased pressure or flow as compared to the inlet fluid flow 94. The fluid pump 90 may pump lubricant, fuel, hydraulic fluid, and/or any other fluid utilized in support of engine and aircraft operation.

Figure 6:
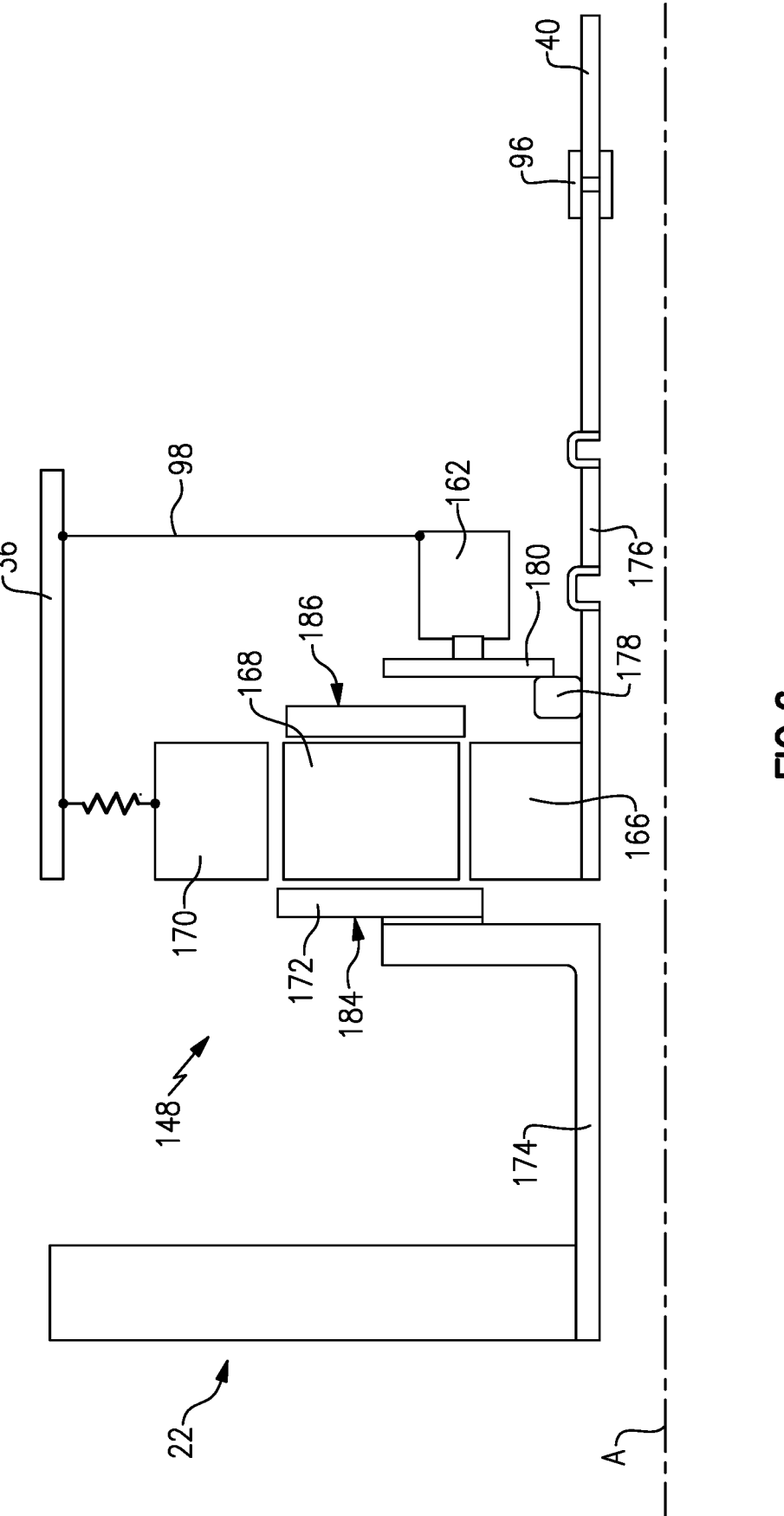
FIG. 6 schematic view of another example fan drive gear system.

Referring to FIG. 6, another example fan drive gear system 148 includes a sun gear 166 driven by an engine shaft 40 about the axis A through the coupling shaft 176. The coupling shaft 176 is attached to the engine shaft 40 through the connection 96.

The accessory component 162 is driven by the gear portion 178 on the coupling shaft 176. The gear portion 178 may be attached to the coupling shaft 176 or may be an integrally formed portion of the shaft 176. The coupling shaft 176 accommodates relative misalignment or movement with the engine shaft 40.

The accessory component is attached by a link 98 to the static engine structure 36. In this example fan drive gear system 148, the ring gear 170 is fixed and the carrier 172 rotates about the engine axis A. The carrier 172 includes a forward portion 184 and an aft portion 186. The forward portion 184 is attached to the fan shaft 174 to drive the fan section 22.

The accessory component 162 is offset from the engine axis A. In this example, the accessory gear 180 rotates about an axis substantially parallel to the engine axis A. However, the accessory gear 180 and the gear portion 178 may be differently configured to provide non parallel mounting configurations.

The example accessory component 162 may be one of a pump, electric motor/generator or any other device that supports engine and/or aircraft operation. Driving the component 162 from the gear system 148 can provides advantageous alternatives to other drive and mounting conventions.

Figure 7:
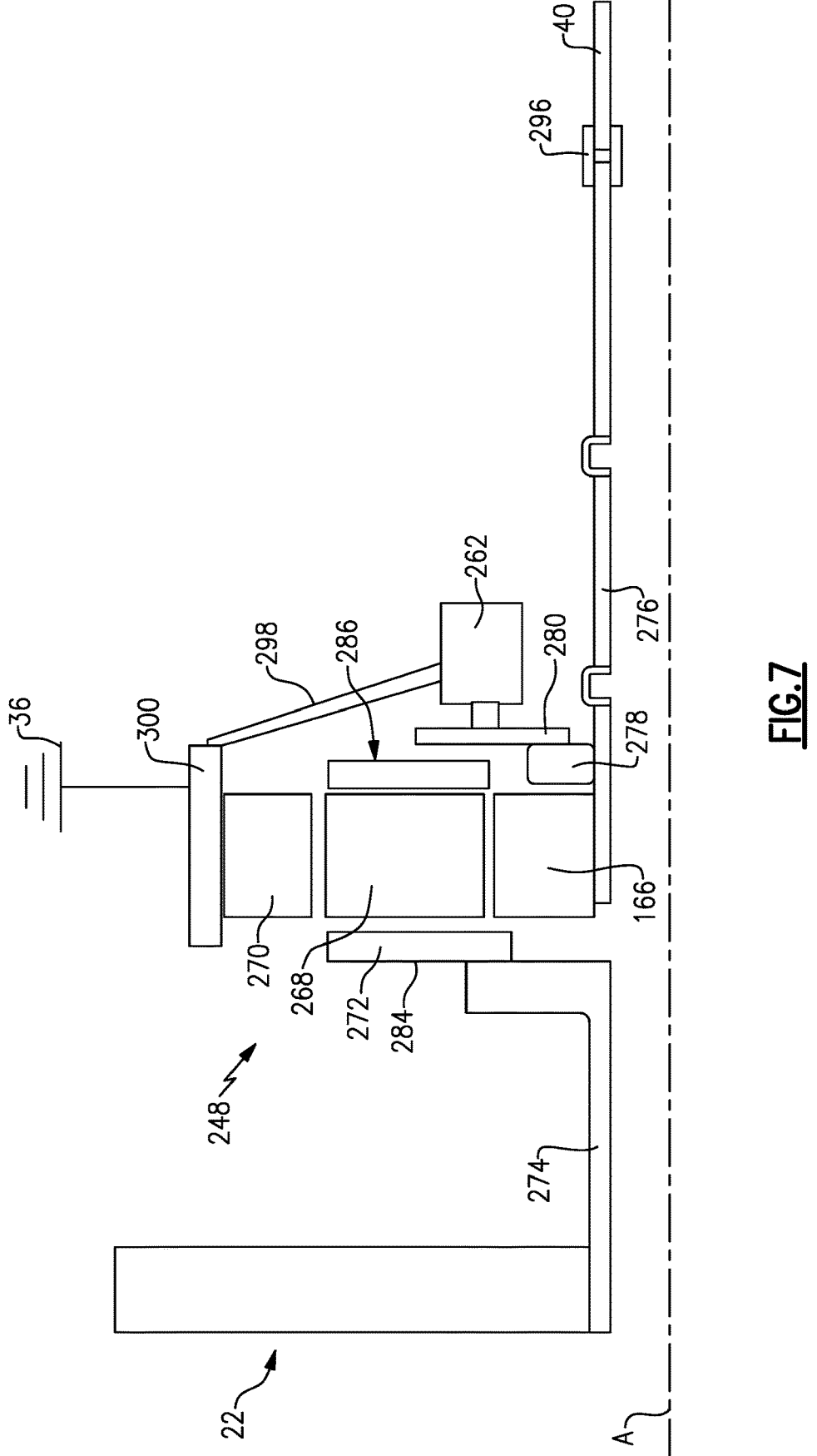
FIG. 7 is a schematic view of yet another example fan drive gear system.

Referring to FIG. 7, another example fan drive gear system 248 is shown and includes features similar to those previous described with regard to the fan drive gear system 148 shown in FIG. 6. In this example embodiment, a sun gear 166 is driven by a coupling shaft 276 through a connection 296 to an engine shaft 40. The sun gear 166 drives intermediate gears 268 supported by a rotatable carrier 272. A fixed ring gear 270 is engaged to the intermediate gears 268. The carrier 272 includes a forward portion 284 and an aft portion 286. The forward portion 284 is attached to a fan shaft 274 to drive the fan section 22.

The accessory component 262 and the ring gear 270 are mounted to the static engine structure 36 through a common fan drive gear system mount 300. The component 262 is attached to the mount 300 through a mount link 298 that is separate from the ring gear 270.

Accordingly, the example fan drive gear systems drive the fan section and provide for operation and driving of accessory components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
    a sun gear configured to be driven by an engine shaft rotatable about an axis, wherein the engine shaft is coupled to and driven by a turbine section of the turbine engine;
    a plurality of intermediate gears coupled to the sun gear;
    a ring gear coupled to the plurality of intermediate gears;
    a carrier supporting rotation of the plurality of intermediate gears;
    a coupling shaft engaged to drive the sun gear, the coupling shaft extends axially forward from the engine shaft for rotation about the axis and includes a gear portion, wherein the coupling shaft is fixed to the engine shaft such that the coupling shaft and the engine shaft rotate at a common speed; and
    an accessory component that is coupled to the gear portion of the coupling shaft, wherein the carrier and the accessory component are both attached to a common static engine structure and the ring gear is rotatable about the axis.

2. The fan drive gear system as recited in claim 1, wherein the accessory component is mounted downstream of the carrier.

3. The fan drive gear system as recited in claim 1, wherein the coupling shaft includes at least one flexible portion for accommodating relative movement between the engine shaft and the fan drive gear system.

4. The fan drive system as recited in claim 3, further comprising a flexible mount between the carrier and the static engine structure and both the carrier and the accessory component are mounted to the flexible mount.

5. The fan drive gear system as recited in claim 1, wherein the accessory component comprises an electric motor/generator.

6. A turbine engine assembly comprising:

a static engine structure;

a fan section including a plurality of blades rotatable about an axis;

a compressor section, a combustor section, and a turbine section disposed along the axis, wherein the turbine section is coupled to an engine drive shaft rotatable about the axis;

a fan drive gear system including a sun gear configured to be driven by an engine shaft rotatable about the axis, a plurality of intermediate gears coupled to the sun gear, a ring gear coupled to the plurality of intermediate gears, and a carrier supporting rotation of the plurality of intermediate gears;

a coupling shaft fixed to the engine drive shaft such that both the coupling shaft and the engine drive shaft rotate at a common speed and the coupling shaft is engaged to drive the sun gear, the coupling shaft extends axially forward from the engine shaft for rotation about the axis and includes a gear portion;

an accessory component that is coupled to the gear portion of the coupling shaft; and a fan drive shaft coupled to a portion of the fan drive gear system to drive the fan section, wherein the carrier and the accessory component are both attached to a common static engine structure and the ring gear is rotatable about the axis.

7. The turbine engine assembly as recited in claim 6, wherein the carrier is attached to the static engine structure through a flexible mount, and the accessory component is mounted to the flexible mount.

8. The turbine engine assembly as recited in claim 6, wherein the gear portion of the coupling shaft is disposed downstream of the carrier.

9. The turbine engine assembly as recited in claim 6, wherein the accessory component comprises an electric motor/generator.

10. A method of powering an accessory component of a turbine engine assembly comprising:

assembling a fan drive gear system including a sun gear configured to be driven by an engine shaft rotatable about an axis, a plurality of intermediate gears coupled to the sun gear, a ring gear coupled to the plurality of intermediate gears, and a carrier supporting rotation of the plurality of intermediate gears;

attaching the carrier to a static engine structure and assembling the ring gear such that it is rotatable about the axis;

coupling a coupling shaft to the engine drive shaft and sun gear such that the engine drive shaft, coupling shaft and the sun gear rotate at a common speed, wherein the coupling shaft extends axially forward from the engine shaft for rotation about the axis and the coupling shaft includes a gear portion;

mounting an accessory component proximate the fan drive gear system on the same static engine structure to which the carrier is attached;

coupling a driven gear of the accessory component to the gear portion of the coupling shaft; and coupling a fan drive shaft to a portion of the fan drive gear system to drive a fan section.

11. The method as recited in claim 10, further comprising assembling the fan drive gear system such that the carrier is attached to the static engine structure through a flexible mount and the accessory component is attached to the static engine structure through the flexible mount.

\* \* \* \* \*